(12) United States Patent
Hatori (10) Patent No.: US 7,523,944 B2
(45) Date of Patent: Apr. 28, 2009

(54) SEAL RING (75) Inventor: Shigeyuki Hatori, Kashiwazaki (JP)

(73) Assignee: Kabushiki Kaisha Riken, Tokyo (JP)

( * ) Notice: Subject to any disclaimer, the term of this patent is extended or adjusted under 35 U.S.C. 154(b) by 0 days.

(21) Appl. No.: 10/541,573

(22) PCT Filed: Apr. 1, 2004

(86) PCT No.: PCT/JP2004/004792

§ 371 (c)(1),
(2), (4) Date: Jul. 7, 2005

(87) PCT Pub. No.: WO2004/090390

PCT Pub. Date: Oct. 21, 2004

(65) Prior Publication Data

US 2006/0055119 A1 Mar. 16, 2006

(30) Foreign Application Priority Data

Apr. 2, 2003 (JP) ............................. 2003-099310

(51) Int. Cl.
*F16J 9/12* (2006.01)
(52) U.S. Cl. ..................... 277/460; 277/465
(58) Field of Classification Search ................. 277/435, 277/447, 452, 459, 460, 465
See application file for complete search history.

(56) References Cited

U.S. PATENT DOCUMENTS

| 2,112,103 | A | * | 3/1938 | Kottusch | 277/464 |
| 2,970,023 | A | * | 1/1961 | Thompson | 277/460 |
| 3,214,182 | A | * | 10/1965 | Herbruggen | 277/465 |
| 3,735,992 | A | * | 5/1973 | Prostorov et al. | 277/464 |
| 4,681,326 | A | * | 7/1987 | Kubo | 277/447 |
| 4,883,029 | A | * | 11/1989 | Winston | 123/193.6 |
| 5,169,162 | A | * | 12/1992 | Azaml et al. | 277/465 |
| 5,632,494 | A | * | 5/1997 | Oka | 277/500 |
| 6,189,896 | B1 | * | 2/2001 | Dickey et al. | 277/608 |
| 2006/0055120 | A1 | * | 3/2006 | Umetsu et al. | 277/459 |
| 2006/0255546 | A1 | * | 11/2006 | Breuer et al. | 277/447 |

FOREIGN PATENT DOCUMENTS

| JP | 6-18764 U | 3/1994 |
| JP | 8-219292 A | 8/1996 |
| JP | 9-210211 A | 8/1997 |
| JP | 9-217836 A | 8/1997 |
| JP | 2004-28273 A | 1/2004 |
| WO | 01/84024 A1 | 11/2001 |

* cited by examiner

*Primary Examiner*—Patricia L Engle
*Assistant Examiner*—Gilbert Y Lee
(74) *Attorney, Agent, or Firm*—Kubovcik & Kubovcik

(57) ABSTRACT

A plurality of first inclined faces (51) are provided on a side face of a seal ring (5) to be distanced away from each other. The first inclined face (51) opens to an inner circumferential face (23) and the side face of the seal ring (5). A column portion (54) is provided between adjacent first inclined faces (51). Portions at both ends of the first inclined face (51) serve as converging portions (52) that are conical smoothly-inclined faces, each converging to the adjacent column portion (54). On the column portion (54), the second inclined face (57) is formed.

8 Claims, 8 Drawing Sheets

NUMBER OF CONCAVE PORTION
ON SIDE FACE OF SEAL RING

SEAL RING

This application is a 371 of international application PCT/JP2004/004792 file Apr. 1, 2004, which claims priority based on Japanese patent application No. 2003-99310 filed Apr. 2, 2003, which is incorporated herein by reference.

BACKGROUND OF THE INVENTION

1. Field of the Invention

The present invention relates to a seal ring, mounted in a ring groove provided in a shaft of a device such as an automatic transmission (hereinafter, simply referred to as AT), for maintaining the oil pressure required for an operation of that device.

2. Description of the Related Art

Seal rings used in a device such as an AT are respectively mounted in a pair of ring grooves, provided on an outer circumferential surface (periphery) of a shaft of the device, to be distanced away from each other. The outer circumferential surface of the seal ring is in contact with an inner circumferential surface of a housing for accommodating a clutch plate or a brake plate slidable on that surface. Each of the seal rings receives operating (hydraulic) oil, supplied from an oil channel between the ring grooves, at one side face, i.e., a pressure-receiving side face, and the inner circumferential face thereof while sealing the side face of the ring groove and the inner circumferential surface of the housing with the opposite side face, i.e., the contact side face, and the outer circumferential surface. Sliding movement of the side face of the seal ring, with respect to the wall face of the ring groove, maintains the operating oil at an appropriate pressure between the seal rings.

Under this condition, the seal ring is required to show small frictional loss and to be able to maintain good sealing properties for a long time. When the seal ring is thus mounted, any frictional force between the side face of the seal ring and the wall face of the ring groove of the shaft has to be small. However, in the case of a conventional seal ring having a rectangular cross section, the contact area between the side face of the seal ring and the wall face of the ring groove is large. Consequently the frictional loss is large.

In recent years, improvements in fuel consumption by further reducing the weight of the AT and reduction of friction have been demanded from the viewpoints of improving vehicle performance and increasingly tighter environmental standards. Thus, for the seal ring, an improvement in its characteristics has been demanded so as to achieve both reduction in friction between the seal ring and the wall face of the ring groove and good sealing properties irrespective of the processing accuracy of the ring groove.

Figure 4:
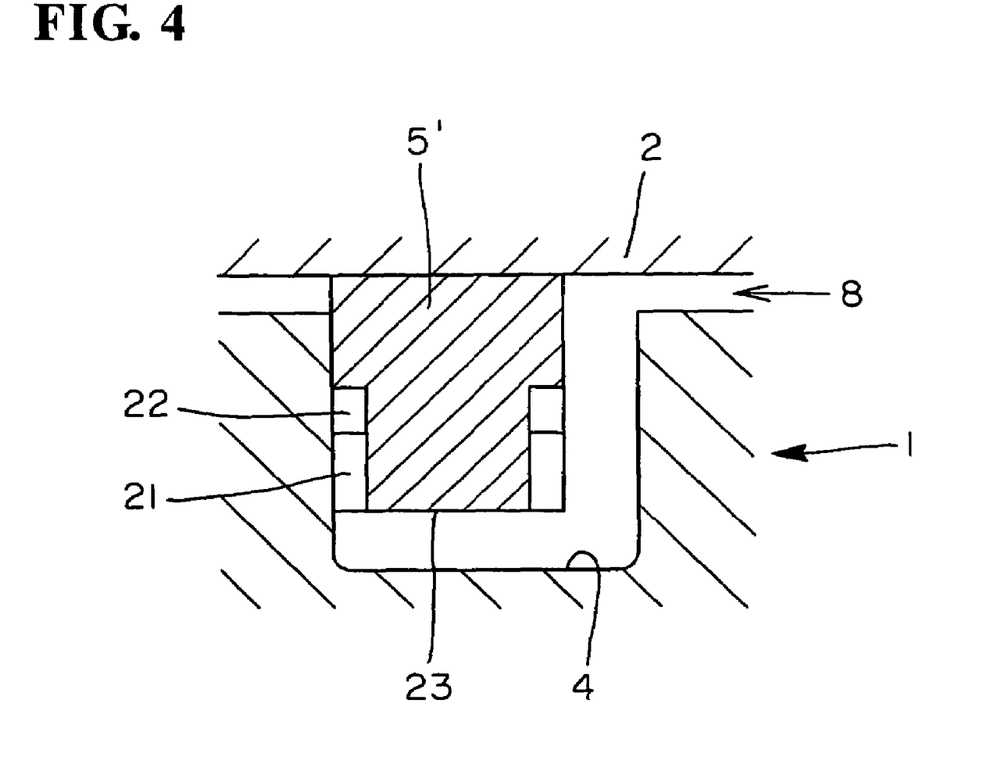
FIG. 4 shows a cross-sectional view of a conventional seal device, showing a region where a seal ring having a groove on its side face is mounted.
Figure 5:
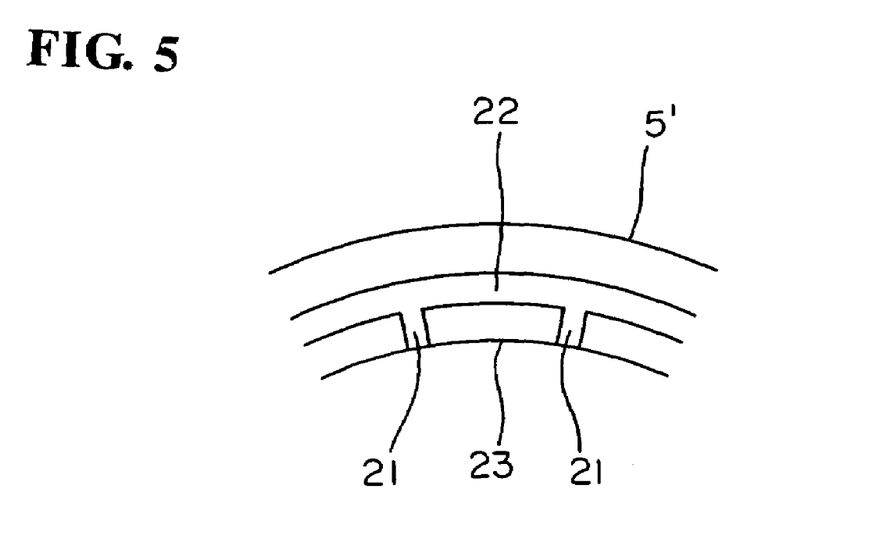
FIG. 5 shows a partial plan view of the conventional seal ring shown in FIG. 4.

As an example of a typical conventional seal ring, Japanese Utility-Model Laid-Open Publication No. Hei 6-18764 discloses a seal ring, as shown in FIGS. 4 and 5. A seal ring 5', mounted in a ring groove 4 of a shaft 1, has an annular groove 22 on its side face that extends in a circumferential direction, and a plurality of grooves 21 that are distanced away from each other in the circumferential direction so as to be directed in a radial direction. Through the radially directed grooves 21, the annular groove 22 is opened to the inner circumferential face 23 of the seal ring 5'. The side face of the seal ring 5' is opposed to and in contact with the side face of the ring groove 4 through the radially directed grooves 21 and the annular groove 22. The reference numeral 2 denotes a housing, and 8 denotes a flow of supplied oil.

Japanese Patent Laid-Open Publication No. Hei 9-210211 discloses a seal ring 5" having a plurality of oil grooves 24 on the side faces of the seal ring 5" to be distanced away from each other (the grooves 24 are opened toward the inner circumferential face of the seal ring 5"), and an inclined concave portion 24' as a wedge-effect generation face that extends at the circumferential direction side of that oil groove and is connected to that oil groove.

In each of the above two seal rings 5' and 5", a pushing force against the wall face of the ring groove is reduced by the pressure from oil introduced into the radially directed grooves 21, 24, the circumferentially directed groove 22, and the concave portion. Therefore the contact pressure between the seal ring and the wall face of the ring groove is reduced. Thus, the above seal rings 5' and 5" are effective at reducing friction and improving lubricating function.

Figure 6:
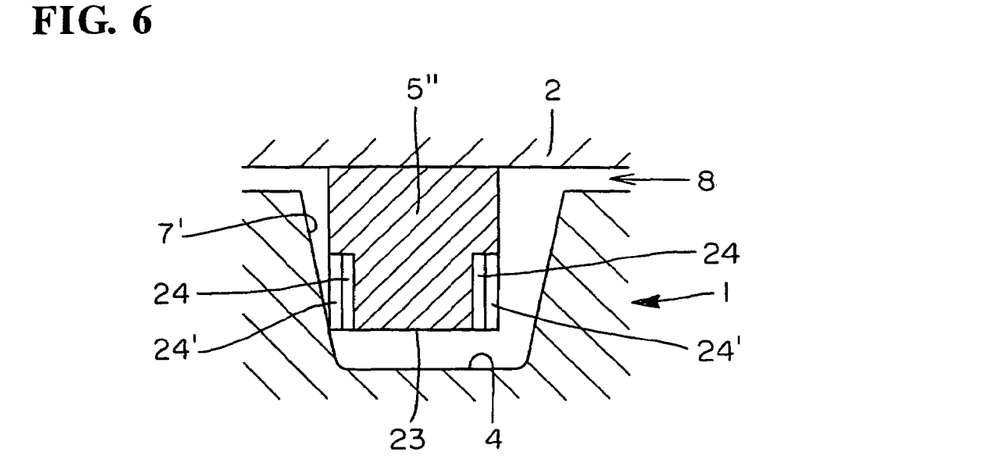
FIG. 6 shows a cross-sectional view of a conventional seal device, showing a region where a seal ring having an oil-groove on its side face is mounted.

However, due to variation in the processing accuracy of the wall face of the ring groove, the ring groove often broadens outward, i.e., the wall face 7' of the ring groove is often tapered in such a manner that the width of the ring groove at the bottom of the ring groove is smaller than that at the opening thereof, as shown in FIG. 6. When the seal ring shown in FIG. 4 or 6 is used with such a ring groove, an inner circumferential corner of the side face of the seal ring may come into contact with the wall face 7' of the ring groove. This allows oil that entered the region on the inner circumferential side of the seal ring to leak through gaps with the seal ring away from each other, resulting in degradation of the seal properties of the side face of the seal ring.

Figure 7:
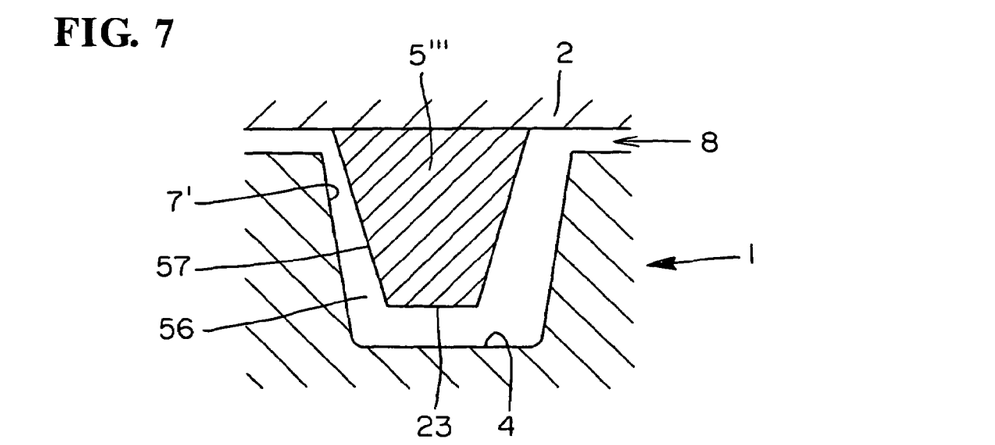
FIG. 7 shows a cross-sectional view of a conventional seal device, showing a region where a seal ring having a tapered side face is mounted.

A seal ring for overcoming the above problem is described in Japanese Patent Laid-Open Publications Nos. Hei 8-219292 and Hei 9-217836. As shown in FIG. 7, in this seal ring 5''' a side face 57 is tapered at an angle of 2° to 10° in such a manner that the width of the seal ring on the inner circumferential side is smaller than that on the outer circumferential side. For this seal ring 5''', since the side face 57 thereof is tapered, contact between the side face 57 and the wall face 7' of the ring groove does not disengage even if the ring groove broadens outward because of variations in the processing accuracy of the wall face 7'. Thus, this seal ring 5''' has an advantage in that the sealing properties are not significantly degraded.

Moreover, since the side face of the seal ring is a tapered face that is inclined inward as it travels radially inward, a wedge-like gap 56 that is opened inward in the radial direction is formed between the side face of the seal ring and the sidewall face of the ring groove. Thus, any contact pressure between the seal ring 5''' and the sidewall face of the ring groove is reduced by the pressure from the oil introduced into that gap 56. Friction is thus reduced.

However, in a case where the groove broadens outward because of variations in the processing accuracy of the wall face of the ring groove, the above-described wedge-like gap is not formed between the side face of the seal ring and the side wall face of the ring groove. Thus, the above-described action of the oil pressure is inadequate and the desired reduction of friction cannot be achieved.

Figure 8:
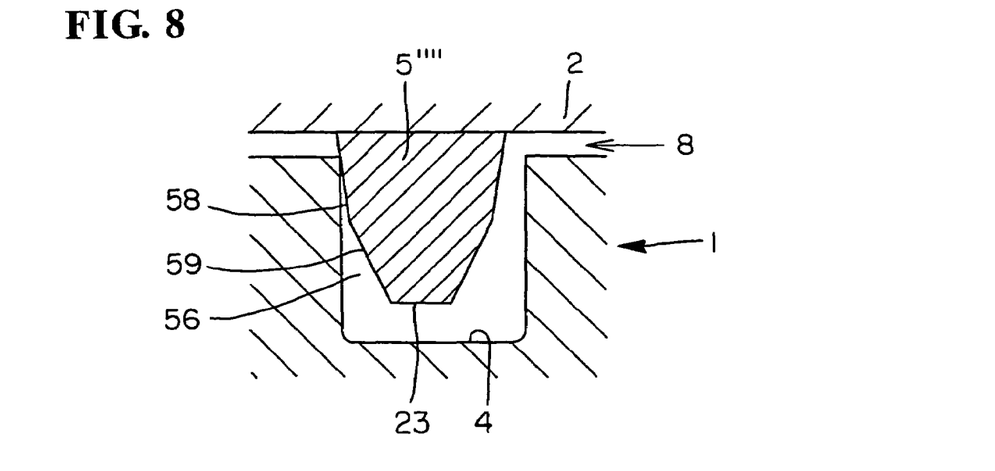
FIG. 8 shows a cross-sectional view of a conventional seal device, showing a region where a seal ring having a two-tier side face, that corresponds to improved tapered side face, is mounted.

FIG. 8 shows a seal ring 5'''' obtained by improving the above seal ring described in Japanese Patent Laid-Open Publication No. Hei 8-219292. The seal ring 5'''' is provided with a tapered face in such a manner that the width between both side faces of the seal ring on the inner circumferential side is smaller than that on the outer circumferential side.

A feature of this seal ring 5'''' is as follows. Both the side faces are formed to be two-tier tapered faces each of which includes a first inclined face 58 and a second inclined face 59 arranged on the inner circumferential side of the first inclined face 58. Here, the inclination angle of the second inclined face 59 is larger than that of the first inclined face 58. In this example, the inclination angle of the first inclined face 58 is set in the range from 0.5° to 3°, while the inclination angle of the second inclined face 59 is set in the range from 9° to 11°.

This seal ring 5'''' has an advantage that, even if the wall face of the ring groove is tapered like the wall face 7' where the ring groove broadens outward, contact between the side face of the seal ring 5'''' and the sidewall face of the ring groove does not disengage. This is due to the inclination angle of the first inclined face 58 positioned on the outer circumferential side. Therefore significant degradation of the sealing properties does not occur. Moreover, due to the inclination angle of the second inclined face 59 positioned on the inner circumferential side, the contact pressure between the seal ring 5'''' and the sidewall face of the ring groove is reduced by the action of pressure from oil introduced into the gap 56. Friction is thus reduced.

However, in the seal ring having the one-tier tapered structure, an oil leakage path which releases inside oil pressure to the outside through the wedge-like gap is formed between a top end of a projection having an abutting end structure and an end face of the wall of the ring groove that is opposed to the top end of the projection. Thus, the sealing effect of this type of special abutting end structure cannot be sufficiently maintained.

In addition, the principle of the seal ring having a two-tier tapered structure is the same as the above seal ring of a one-tier tapered structure. Thus, although the seal ring of the two-tier tapered structure can improve sealing properties, there is still a problem with the sealing properties that needs to be overcome.

SUMMARY OF THE INVENTION

The present invention was made in order to solve the problems that could not be overcome with the aforementioned conventional technologies, and it is an object of the present invention to provide a seal ring that can maintain low friction and can reduce oil leakage without being affected by processing accuracy of a sidewall face of a ring groove and depending on an abutting end structure of the seal ring.

In order to achieve the above object, the present invention basically employs a structure in which concave portions and flat column portions as a framework of a body of a seal ring are alternately and continuously formed on a side face of the seal ring. The concave portion is formed by a deepest inclined portion (first inclined portion) and converging portions positioned on both sides of the first inclined portion in a circumferential direction. The first inclined portion is provided in an inner circumferential part of the side face of the seal ring to reduce a thickness of the seal ring toward the inner circumference of the seal ring. Each of the converging portions converges to a point of the adjacent column portion that is the closest to the inner circumference of the seal ring. On the inner circumferential side of the column portion and the converging portion, a second inclined portion is provided so as to reduce the thickness of the seal ring toward the inner circumference of the seal ring.

In this structure, because of a wedge-like gap between the concave portion of the side face of the seal ring and the sidewall face of the ring groove, a force pushing the other side face of the seal ring can be canceled, thereby reducing loss torque generated between the side face of the seal ring and the wall of the ring groove. Moreover, by chamfering the column portion to provide the second inclined face in such a manner that the thickness of the seal ring is reduced toward the inner circumference of the seal ring, a contact position at which the seal ring comes into contact with the ring groove can be arranged outer in the radial direction as compared with a conventional seal ring, even if the ring groove broadens outward.

Thus, an oil-pressure opening that releases inner oil pressure to the outside can be made smaller, resulting in significant improvement in sealing properties of the seal ring.

Furthermore, according to the seal ring of the present invention, an outer circumferential part of the side face is formed by a flat face perpendicular to the outer circumferential face of the seal ring. Thus, the seal ring of the present invention can achieve excellent sealing properties irrespective of a shape of an abutting end portion.

It is now described how the concave portion of the side face according to the present invention functions. The concave portion of the side face of the seal ring, which is opposed to the annular ring groove of the shaft, is formed by the deepest inclined portion (first inclined portion) and smooth converging portions arranged on both sides of the deepest inclined portion in the circumferential direction. The deepest inclined portion is opened only toward the inner circumferential face of the seal ring side. The converging portions connect with the flat portion of the side face of the seal ring and serve as an inclination face for generating wedge-effect. Thus, the wedge-like gap is generated between the concave portion of the seal ring and the sidewall face of the ring groove, and cancels a force pushing the other side face of the ring. As a result, loss torque generated between the side face of the seal ring and the groove wall can be surely reduced, thus improving fuel consumption of a product using the seal ring of the present invention.

Moreover, in an abutting end portion, no concave portion is formed on the side face. Instead, the abutting end portion is formed to be flat. Thus, an advantageous effect of the special abutting end structure can be achieved sufficiently. Therefore, it is possible to ensure the sealing properties including low oil leakage property.

Furthermore, according to the present invention, a connecting portion between the column portion and the deepest portion of the concave portion in the side face of the seal ring is formed by a conical inclined face. Thus, it is possible to allow oil entering the concave portion to be smoothly taken into a sliding face, i.e., the column portion, so that the oil is supplied to the sliding face to improve abrasion resistance. In addition, due to the conical inclined face, the direction of the lifting force becomes closer to a direction perpendicular to the rotating direction of the seal ring. Thus, a canceling pressure is further amplified by the addition of the lifting force. Friction is thus reduced further. In addition, by optimizing the number of the concave portions and the number of the column portions, friction can be reduced more effectively.

BRIEF DESCRIPTION OF THE DRAWINGS

FIGS. 3(*a*) and 3(*b*) show cross-sectional views of the seal ring of the present invention, taken along line II-II and line III-III in FIG. 2, respectively.

DETAILED DESCRIPTION OF THE PREFERRED EMBODIMENTS

Figure 1:
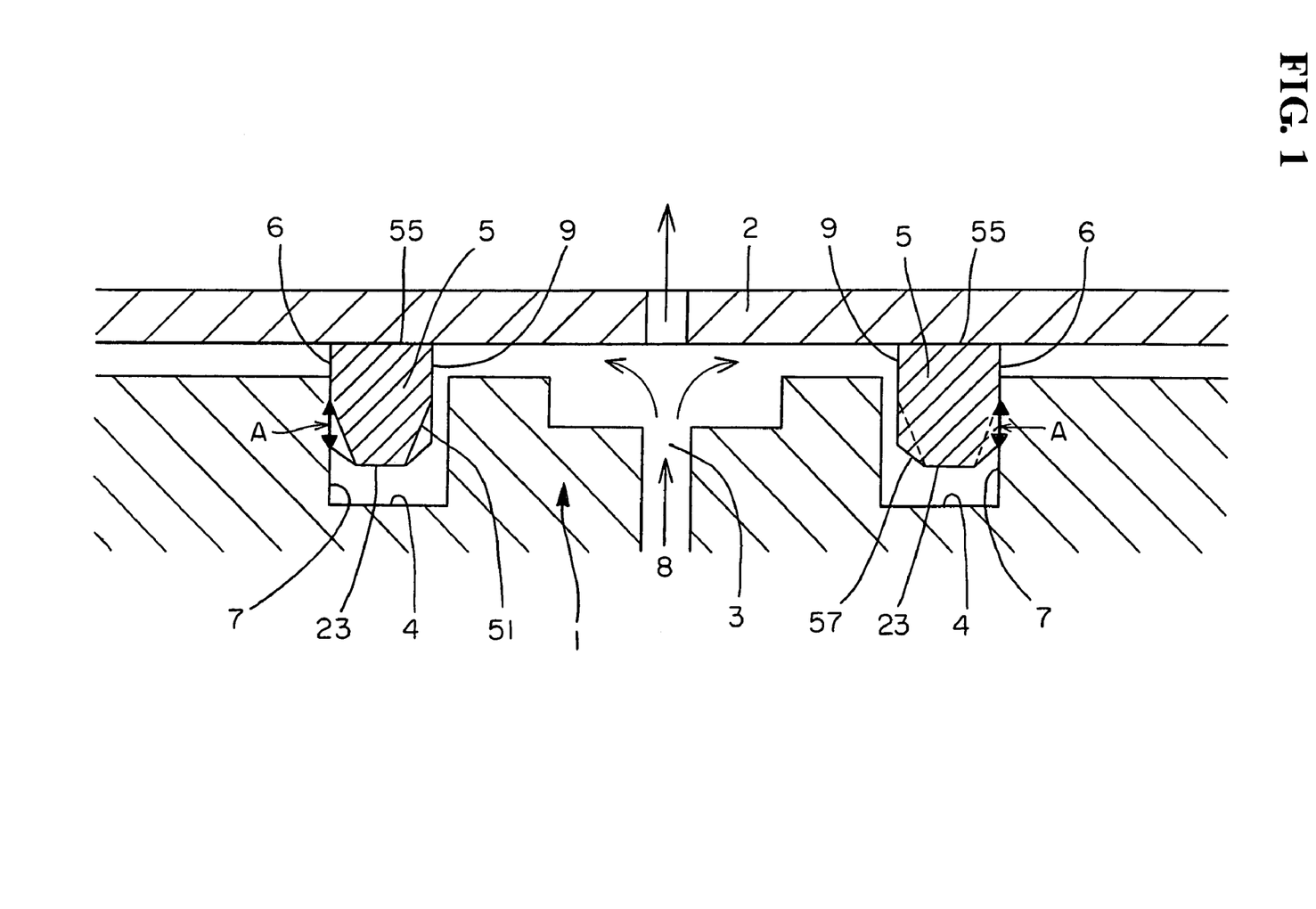
FIG. 1 shows a cross-sectional view of a seal device according to an embodiment of the present invention, showing a region where a seal ring is mounted.

The present invention will now be described based on the preferred embodiments, with reference to the drawings. FIG. 1 is a view in which a seal rings 5 of the present invention are mounted in each of a pair of ring grooves 4 that are provided on an outer circumferential surface of a shaft 1 and distanced away from each other. A channel between the ring grooves 4 delivers operating oil 8 to a pressure-receiving side face 9 and an inner circumferential face 23 of each seal ring 5. Each seal ring 5 forms a seal with sidewall face 7 of the ring groove 4 and the inner circumferential surface of a housing 2 by their proximity with contact side face 6 and outer circumferential face 55 respectively. In the inner circumferential part of each side face of the seal ring 5, concave portions are formed.

Figure 2:
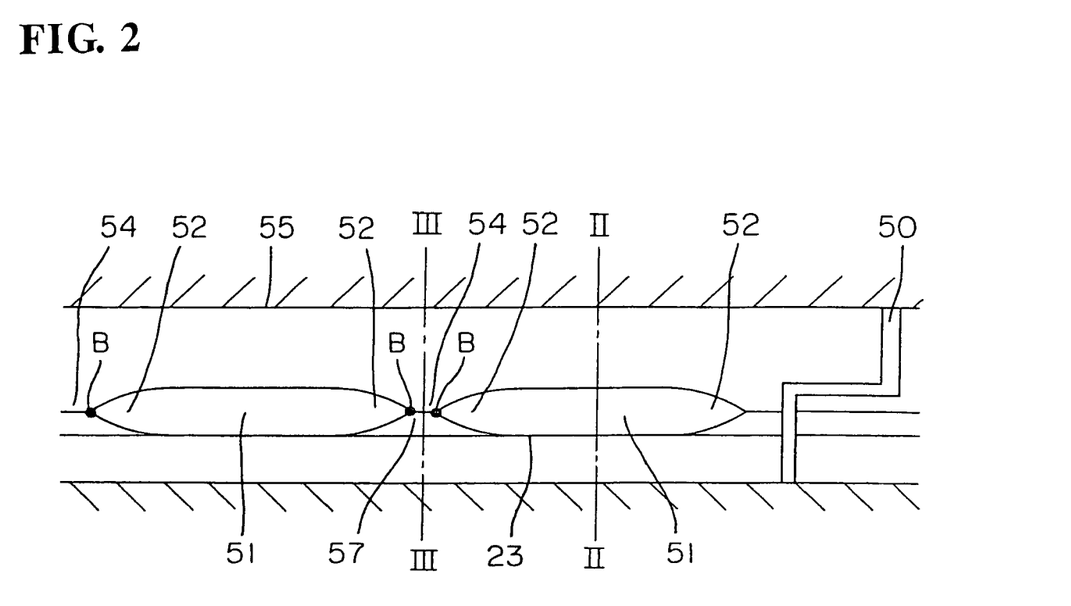
FIG. 2 shows a partial Plan view of the seal ring according to the embodiment of the present invention as shown in FIG. 1 in which an inner circumferential surface is developed.

As shown in FIG. 2, the concave portion is formed by the first inclined face 51 and converging portions 52 arranged on both sides of the first inclined face 51 in the circumferential direction. The converging portion 52 converges to a point B in an adjacent column portion 54 which is the closest point to the inner circumference of the seal ring 5. The concave portion has a pocket-like shape that extends long in the circumferential direction.

The concave portion has a shape obtained by extending the deepest portion (first inclined face) 51 in the circumferential direction and is positioned away from the other concave portions in the circumferential direction. Between the concave portions is provided a column portion 54 in the form of a flat bank. On the inner circumferential side of the column portion 54 and the converging portion 52, the second inclined face 57 is formed in such a manner that the thickness of the seal ring is reduced toward the inner circumference of the seal ring 5.

As described above, the seal ring 5 of the present invention has the feature that its side face includes concave portions and column portions 54 continuously and alternately arranged in the circumferential direction.

It is preferable that the width of the first inclined face 51 in the circumferential direction be larger than its maximum depth thereof and be also larger than the width of the second inclined face 57 in the circumferential direction. Please note that the width of the second inclined face 57 in the circumferential direction is the width of the column portion in the circumferential direction (the width between points B in FIG. 2). It is more preferable that the width of the first inclined face 51 in the circumferential direction be 8-50 times as large as the width of the second inclined face 57 in the circumferential direction. In a case where the width of the first inclined face 51 in the circumferential direction is smaller than 8 times the width of the second inclined face 57 in the circumferential direction, experiments demonstrated that the contact area between the side face of the seal ring and the wall face of the ring groove increased and therefore decreased friction reducing effects. On the other hand, in a case where the width of the first inclined face 51 in the circumferential direction is larger than 50 times that of the second inclined face 57, the effect of a lifting force (detailed later) is small and friction is not markedly reduced.

Moreover, it is preferable that the width of each converging portion in the circumferential direction be equal to or larger than 1/50 of the width of the first inclined face 51 in the circumferential direction. In a case where the width of each converging portion in the circumferential direction is smaller than 1/50 of that of the first inclined face 51, the inclination of the converging portion becomes steeper. Thus, the effect of the lifting force to be detailed later is small, and losses in torque are not markedly reduced. The width of the converging portion in the circumferential direction has no upper limit. Even in a case where the concave portion does not include the first inclined face 51 but is formed by the converging portion only (in this case, the converging portion extends from a point of contact with the column portion 54 to the deepest inclined part of the concave portion and then converges toward the inner circumferential side of the opposite column portion immediately), advantageous effects of the present invention can be achieved. However, the friction reducing effects can be further improved by providing the first inclined face 51. Especially, until a width ratio of the first inclined face to the converging portion reaches about 1 to 1, friction is significantly decreased.

Figures 3A, 3B:
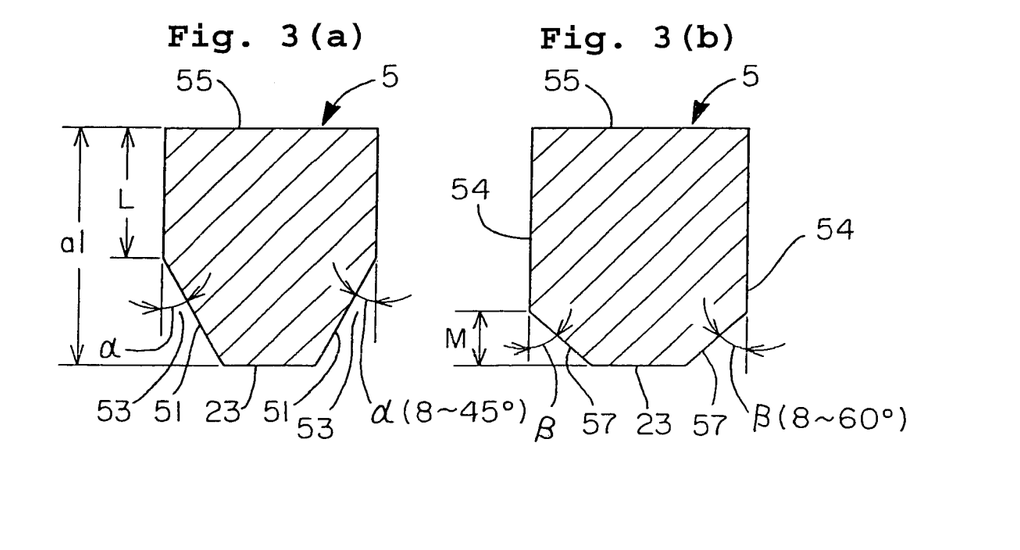

FIGS. 3(a) and 3(b) show cross-sectional views taken along line II-II and line III-III in FIG. 2, respectively. As shown in FIG. 3(a), the inclination angle α of the first inclination face 51, forming the concave portion in the side face of the seal ring, is measured with respect to a plane perpendicular to the outer circumferential face 55 of the seal ring 5, i.e., a plane perpendicular to the axial center of the seal ring 5. This inclination angle α is preferably in the range from 8° to 45°, more preferably in the range from 14° to 18°. In a case of a concave portion having no first inclination face, the inclination angle at the deepest inclined part of the concave portion is set within the range described above.

By setting the inclination angle α within the above-described range, a lifting force has a direction made closer to a direction perpendicular to a rotating direction of the seal ring by a wedge-like gap 53 formed between the sidewall face of the ring groove and the concave portion of the seal ring, i.e., the first inclined face 51, and the conical converging portions 52 at both ends of the concave portion. This lifting force act on oil and cancels a force pushing the other side face of the seal ring. Thus, there is a reduction in torque loss arising between the side face of the seal ring and the wall face of the ring groove, thereby resulting in an improvement in fuel consumption.

Figure 11:
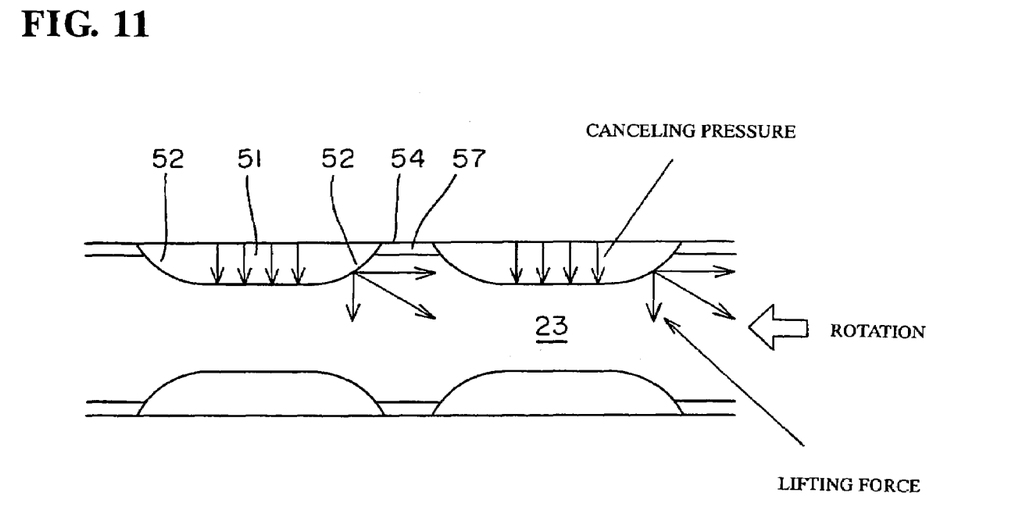
FIG. 11 shows an inner circumferential face of the seal ring according to an embodiment of the present invention and a component of canceling pressure acting on a concave portion of the seal ring.

FIG. 11 shows the action of the lifting force. The canceling pressure acting on the first inclined face 51 also acts on the converging portion 52. The lifting force is a part of this canceling pressure, i.e., a component force, and acts in the same direction as the canceling force. This lifting force contributes to the reduction of torque loss.

In a case where the inclination angle α of the first inclined face 51 is smaller than 8°, the wedge-like gap 53 that opens radially inward cannot readily form between the side face of the seal ring and the sidewall face of the ring groove. Thus, any friction reducing effects are insufficient. Moreover, in a case where the inclination angle α is larger than 45°, the wedge-like gap 53 is not formed and therefore the canceling pressure is not generated. Thus, friction cannot be reduced sufficiently.

The outermost point of the first inclined face 51 in the radial direction of the seal ring is arranged at a distance L from the outer circumferential face 55 of the seal ring in the radial direction. It is preferable that L be in the range from 0.4 mm to 1.2 mm or be equal to or smaller than ⅔ of the dimension a1, shown in FIG. 3(a).

A portion having a width of L between the outer circumferential face 55 and the outermost point of the first inclined face 51 in the radial direction is a flat portion and is preferably formed intermittently. In a case where L is smaller than 0.4 mm, it is likely that the outermost point of the concave portion of the seal ring in the radial direction disengages from the sidewall face 7 of the ring groove because of axial runout of the housing or shaft. This degrades sealing properties.

On the other hand, in a case where L is larger than 1.2 mm or ⅔ of the dimension (thickness) a1 of the seal ring in the radial direction, the wedge-like gap (that is formed between the side face of the seal ring and the sidewall face of the ring groove and opens inward in the radial direction) is small. Thus, the generated canceling pressure is small and the friction reducing effects are insufficient.

Moreover, in order to maintain the sealing properties even in a case where the ring groove 4 is formed in a manner where it broadens outward because of variations in the processing accuracy of the sidewall face 7 of the ring groove, a second inclined face 57 can be provided on the inner circumferential side of the flat column portion 54 provided between the concave portions distanced away from each other in the circumferential direction. This second inclined face 57 is formed continuously to reach a region on the inner circumferential side of the converging portion 52.

FIG. 3(b) shows a cross-sectional view of the column portion. The length M of the second inclined face 57 in the radial direction is preferably in the range from ⅕ to ½ of the width (a1–L) from the innermost point of the seal ring 5 to the outermost point of the first inclined face 51 in the radial direction. The length M, set in the above manner, makes the innermost point in the radial direction of the flat portion of the side face of the seal ring closer to the outermost point in the radial direction of the concave portion. This therefore makes an oil-pressure opening (corresponding to A in FIG. 1) in which inner oil pressure is released to the outside is reduced. Thus, it is possible to maintain excellent sealing properties.

In a case where the length M, in the radial direction of the second inclined face 57 in the inner circumferential part of the column portion 54, is less than ⅕ of (a1–L), the oil-pressure opening cannot be made sufficiently small. Therefore the sealing properties cannot be significantly improved, if the wall face of the ring groove is inclined in such a manner that the groove wall broadens outward. In a case where the length M in the radial direction is larger than ½ of (a1–L), the characteristics provided by the shape of the column portion 54 cannot be achieved.

The inclination angle β is preferably in the range from 8° to 60°, and more preferably around 45°. In a case where the inclination angle β is smaller than 8°, the abutting end portion 50 is also inclined and therefore the sealing properties may be degraded. On the other hand, in a case where the inclination angle β is larger than 60°, a gap may be generated between the concave portion in the side face of the seal ring and the wall of the ring groove when the inner circumferential face of the seal ring comes into contact with the wall of the ring groove. In this case, an oil leakage path may be generated, thereby losing the sealing function.

The number of concave portions is preferably in the range from 4 to 16. In a case where the number of concave portions is less than 4, i.e., 1, 2 or 3, the smoothly transfer of oil entering the concave portion into a sliding face as the column portion 54 is reduced, and thus any improvement of abrasion resistance is minimal. In addition, a lifting force is also small because its direction becomes closer to a direction perpendicular to the rotating direction of the seal ring due to the conical inclined face 52. Therefore, dragging torque is not markedly reduced.

On the other hand, in a case where the number of concave portions is more than 16, the wedge-like gap in the circumferential direction which is formed between the sidewall face 7 of the ring groove and the concave portion of the seal ring 5 becomes small and the number of column portions 54 increases. This increases the contact area between the ring groove and the seal ring. Thus, any significant reduction in torque loss arising from between the side face of the seal ring and the wall of the ring groove is not achieved. Experiments showed this fact. In a case where the number of concave portions is in the range from 8 to 12, significant reductions in friction are achieved.

In the above description, the term "canceling pressure" means a pressure reducing a pushing pressure applied to the opposite side face by oil pressure.

In the drawings, a structure is shown in which the structure of the pressure-receiving side face, and that of the contact side face which comes into contact with the wall face of the ring groove, are symmetrical. However, in a case where only the contact side face is formed to include the concave and column portions of the present invention, the advantageous effects of the present invention can also be achieved. From the viewpoint of workability when the seal ring is mounted in the ring groove, it is preferable that the seal ring have a structure in which both side faces are symmetrical and have no directionality.

EXAMPLE

Figure 9:
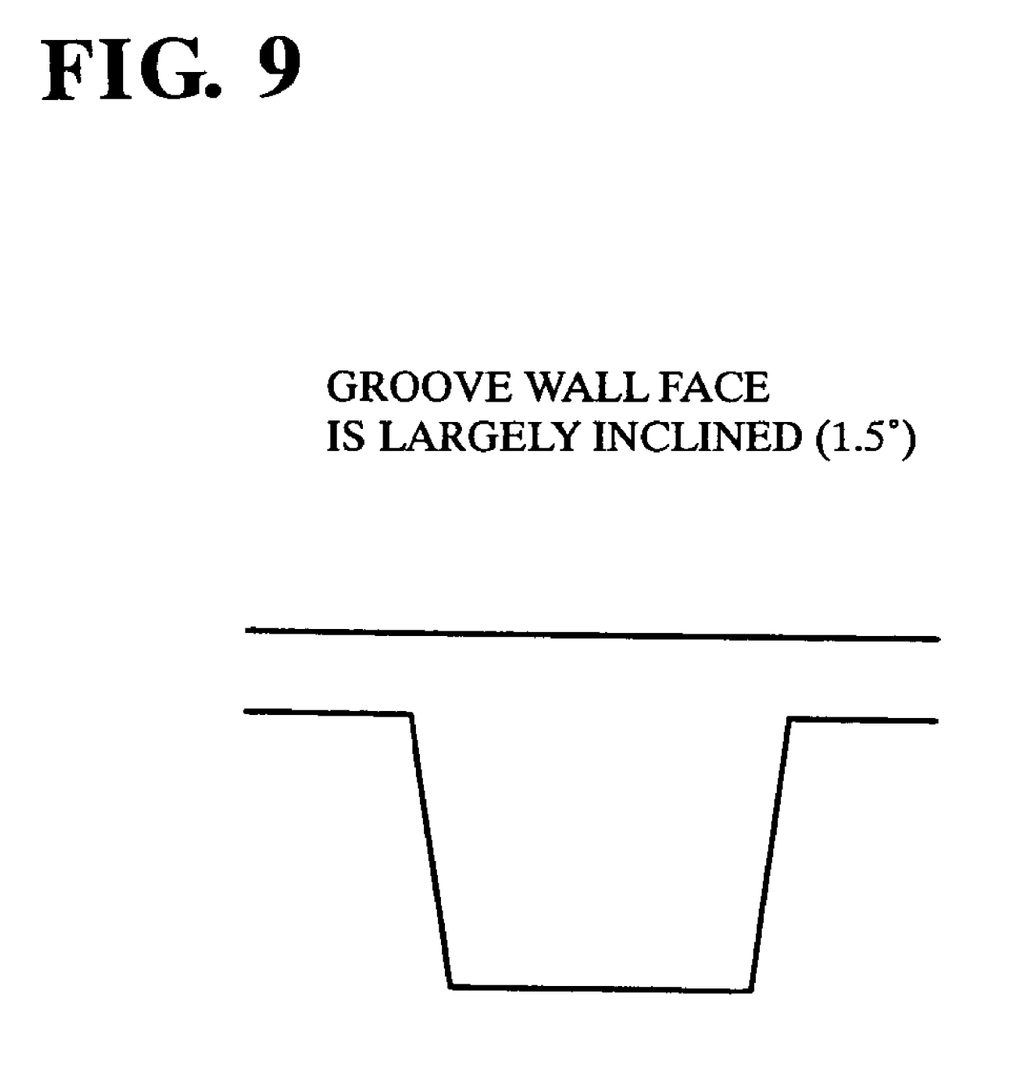
FIG. 9 shows a shape of a groove used in an example of the present invention.

An example of the present invention is now described. A main feature of the seal ring of the present invention is that low oil leakage and low friction are achieved irrespective of the processing accuracy of the sidewall face 7 of the ring groove. Thus, in this example, a shaft having a ring groove that had a sidewall face 7 with an inclination angle of 1.5°, and broadened outward was used (see FIG. 9). The shaft 1 and the housing 2 were made of steel. The width and the depth of the ring groove were 0.3 mm and 0.17 mm, respectively.

The seal ring 5 was made of polyether-ether-ketone (PEEK) resin with carbon fibers added thereto. In the seal ring 5, an outer (nominal) diameter was Φ50, the width in the axial direction was 2.35 mm, the thickness in the radial direction was 2.0 mm, and the inclination angle (α) of the deepest inclined portion of the concave portion of the side face was 16±2°. Moreover, the width of the portion between the outermost point of the deepest inclined portion and the outer circumferential face of the seal ring in the radial direction was 1.0 mm (corresponding to ½ of the thickness a1 in the radial direction). The inclination angle (β) of the second inclined face was 45±2°. Furthermore, fourteen concave portions (a single concave portion was formed by one deepest inclined portion and converging portions on both sides of the deepest inclined portion) were formed, while fifteen second inclined faces 57 (one second inclined face 57 was arranged on each side of the abutting end structure) were also formed. The width of each of the deepest inclined portions in the circumferential direction was 20 times the width of the second inclined face in the circumferential direction. The width of the converging portion in the circumferential direction (each side) was 1/10 of the width of a deepest inclined portion in the circumferential direction.

In addition, in a comparison to example, a conventional seal ring having a groove extending in the circumferential direction on its side face (comparative example 1), and a one-tier tapered seal ring in which its side face had a uniform inclination angle (comparative example 2) were formed from the same material to have equivalent respective dimensions as those in the example. The inclination angle of the side face of the one-tier tapered ring was 5±1°.

Figure 10:
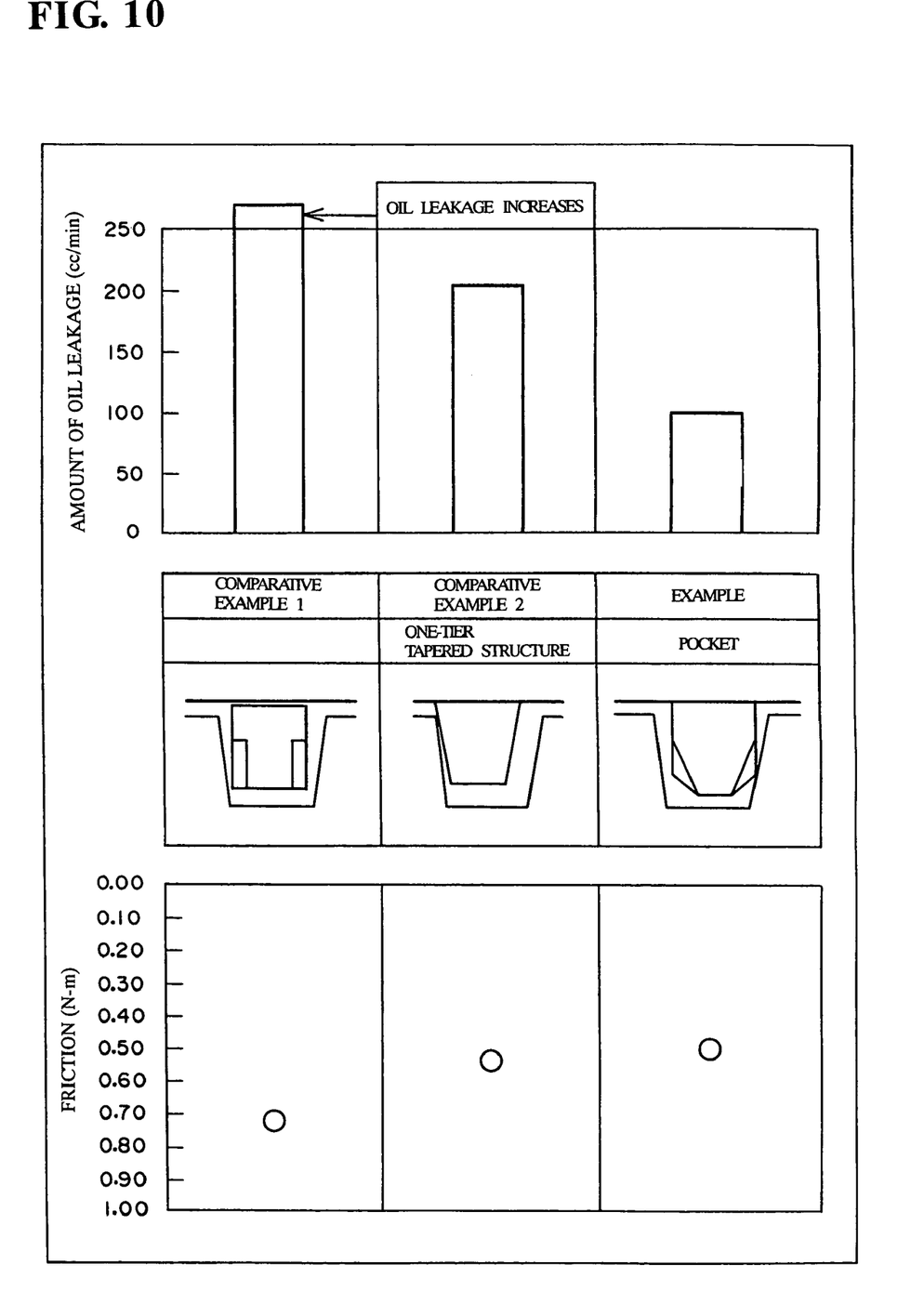
FIG. 10 is a graph showing test results of the seal device of the present invention and the conventional seal device.

While the above seal rings were mounted in the aforementioned groove on the shaft, oil leakage and friction were tested under a condition in which a rotating speed of the housing was 3,000 rpm, oil pressure was 1.27 Mpa, and the oil temperature was 120° C. FIG. 10 shows the test results.

From FIG. 10, it was confirmed that friction in the case of using the seal ring of the example according to the present invention was lower than that when using the seal ring of the comparative example 1. It was also lower than the one-tier tapered seal ring of the comparative example 2. Moreover, the amount of oil leakage in the seal ring of the present invention was ½ or less of that of the seal rings of the comparative examples. Thus, it was found that excellent sealing properties could be achieved by providing an inclination on the inner circumferential side of the flat column portion of the side face, irrespective of the processing accuracy of the sidewall face of the ring wall.

In addition, the seal rings having no concave portion (comparative example 3: the seal ring having a rectangular cross section), four concave portions, eight concave portions and sixteen concave portions on the side faces, respectively, were manufactured.

Figure 12:
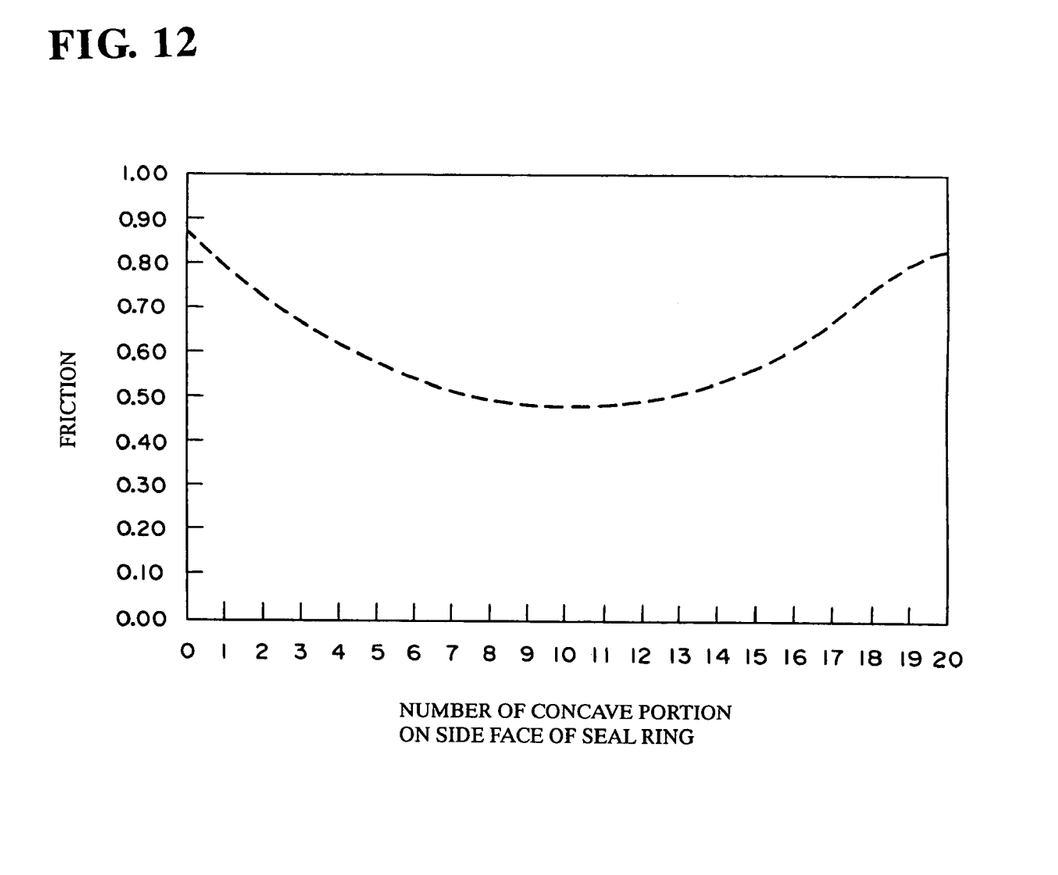
FIG. 12 is a graph showing a test result about a relationship between the number of the concave portions of the seal ring of the present invention and friction.

While each of those seal rings was mounted in the aforementioned ring groove of the shaft, oil leakage and friction were tested under a condition in which a rotating speed of the housing was 2,000 rpm, oil pressure was 1.5 Mpa, and the oil temperature was 120° C. FIG. 12 shows the test results.

From FIG. 12, it was found that the seal ring of the present invention which had concave portions in its side face could reduce friction, as compared with comparative example 3. The relationship between the number of the concave portions and friction was a downward convex curve. When the number of the concave portions was 4 and 16, friction was reduced to ⅔ of that in the comparative example 3. In addition, when the number of the concave portions was in the range from 8 to 12, the further reduction of friction was confirmed.

On the other hand, the oil leakage amount of the seal ring of the present invention having concave portions did not depend on the number of the concave portions. In all examples, the oil leakage amount was ½ or less of that of the one-tier tapered seal ring of comparative example 2. From the aforementioned facts, it was found that the seal ring of the present invention could provide excellent sealing properties even if the ring groove broadened outward.

The seal ring according to the present invention can achieve low friction and low oil leakage that are optimum, irrespective of the processing accuracy of the wall face of a ring groove on a shaft.

Thus, by using this seal ring it is possible to improve the fuel consumption associated with the use of a product incorporating a seal ring.

What is claimed is:

1. A seal ring to be mounted in a ring groove provided on an outer circumferential surface of a shaft, the seal ring comprising an outer circumferential face, an inner circumferential face, and pressure-relieving side and contact side faces between said outer circumferential face and said inner circumferential face; said seal ring dimensioned and configured to receive pressure from oil supplied to the ring groove at its pressure-receiving side face and its inner circumferential face to achieve sealing by its contact side face which is opposite to the pressure-receiving side face and comes into contact with a wall face of the ring groove and its outer circumferential face, wherein a plurality of circumferentially extending concaves are provided along an inner circumferential part of the contact side face and separated from each other along the circumference of the side face by columnar surfaces, each end of each of said plurality of circumferentially extending concaves converges with a surface of the side face to form a converging point, adjacent converging points being separated from each other by said columnar surface, each of said columnar surfaces extends radially outwardly from a line extending between adjacent converging points to an outer circumferential edge of the side face, each of the concaves is formed by a first deepest inclined face provided in the inner circumferential part of the side face of the seal ring, the first deepest inclined face being provided to reduce a thickness of the seal ring toward an inner circumference of the seal ring, and a second inclined face is provided on an inner circumferential side of each columnar surface and extends radially inwardly from said line extending between adjacent converging points to the inner circumferential edge of the side face of the seal ring to reduce the thickness of the seal ring toward the inner circumference of the seal ring, said first deepest inclined face and second inclined face extending continuously from the contact side face to the inner circumferential face.

2. The seal ring according to claim 1, wherein
an inclination angle measured with respect to a plane perpendicular to the axial center of the seal ring of the first deepest inclined face is in the range from 8° to 45°, and a dimension (L) between an outermost point of the first deepest inclined face in the radial direction and the outer circumferential face of the seal ring is 0.4 mm or larger and is equal to or smaller than ⅔ of the thickness (a1) of the seal ring in the radial direction.

3. The seal ring according to claim 2, wherein
an inclination angle measured with respect to a plane perpendicular to the axial center of the seal ring of the second inclined face is in the range from 8° to 60°, and a dimension (M) of the second inclined face in the radial direction is in the range from ⅕ to ½ of a dimension (a1−L) from the inner circumference of the seal ring to an outermost point of the first deepest inclined face in the radial direction.

4. The seal ring according to claim 3, wherein
a width of the first deepest inclined face in the circumferential direction is 8 to 50 times as large as a width of the second inclined face in the circumferential direction, and a number of the concaves included in said contact side face of the seal ring is in the range from 4 to 16.

5. The seal ring according to claim 2, wherein
a width of the first deepest inclined face in the circumferential direction is 8 to 50 times as large as a width of the second inclined face in the circumferential direction, and a number of the concaves included in said contact side face of the seal ring is in the range from 4 to 16.

6. The seal ring according to claim 1, wherein
an inclination angle measured with respect to a plane perpendicular to the axial center of the seal ring of the second inclined portion is in the range from 8° to 60°, and a dimension (M) of the second inclined face in the radial direction is in the range from $1/5$ to $1/2$ of a dimension (a1–L) from the inner circumference of the seal ring to an outermost point of the first deepest inclined face in the radial direction, where a1 is the thickness of the seal ring in the radial direction and L is a dimension between an. outermost point of the first deepest inclined face in the radial direction and the outer circumferential face of the seal ring.

7. The seal ring according to claim 6, wherein
a width of the first deepest inclined face in the circumferential direction is 8 to 50 times as large as a width of the second inclined face in the circumferential direction, and a number of the concaves included in said contact side face of the seal ring is in the range from 4 to 16.

8. The seal ring according to claim 1, wherein
a width of the first deepest inclined face in the circumferential direction is 8 to 50 times as large as a width of the second inclined face in the circumferential direction, and a number of the concaves included in said contact side face of the seal ring is in the range from 4 to 16.

\* \* \* \* \*